235-382 SR

OR 4,280,119

X235-451

United States Patent [19]

May

[11] 4,280,119

[45] Jul. 21, 1981

[54] ULTRASONIC AND CAPACITIVE ELECTRONIC KEY SYSTEMS

[76] Inventor: George A. May, R.R. 1 E. Sooke Rd., Sooke, Canada, VOS1NO

[21] Appl. No.: 97,163

[22] Filed: Nov. 26, 1979

Related U.S. Application Data

[62] Division of Ser. No. 947,596, Oct. 2, 1978.

[51] Int. Cl.³ ........................ H04Q 9/00; G08B 13/16

[52] U.S. Cl. ............................ 340/147 MD; 340/543

[58] Field of Search .............................. 235/451, 487; 340/147 MD, 164 R, 149, 148, 171 R, 543

[56] References Cited

U.S. PATENT DOCUMENTS

| | | | |
|---|---|---|---|
| 3,699,311 | 10/1972 | Dunbar | 235/451 |
| 3,869,082 | 3/1975 | Ludin | 235/451 |
| 4,017,834 | 4/1977 | Cuttill et al. | 340/149 A |
| 4,197,524 | 4/1980 | Salem | 340/147 MD |
| 4,210,900 | 7/1980 | Shavit | 340/149 R |

*Primary Examiner*—Donald J. Yusko

*Attorney, Agent, or Firm*—Limbach, Limbach & Sutton

[57] ABSTRACT

Electronic key systems using no moving parts are disclosed. In one embodiment capacitive sensing is provided and in a further embodiment ultrasonic sensing is used. Both embodiments can employ binary coding for use with local or remote logic circuits to control locking mechanisms.

6 Claims, 14 Drawing Figures

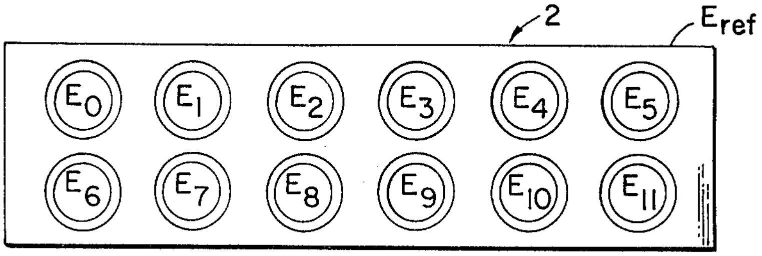
FIG.__1.
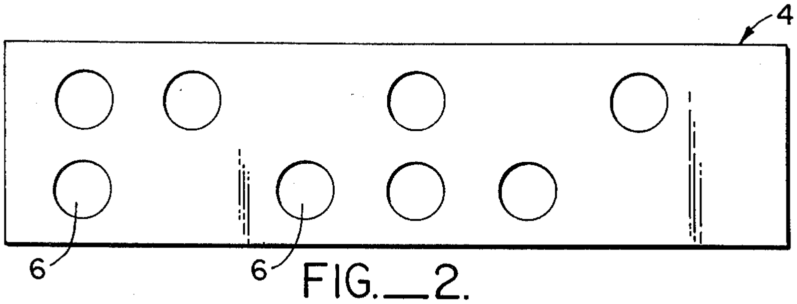
FIG.__2.
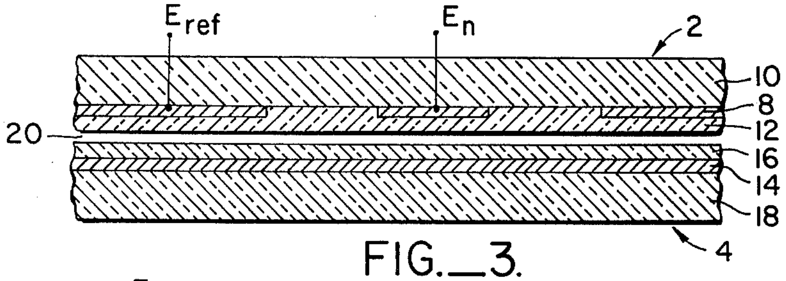
FIG.__3.
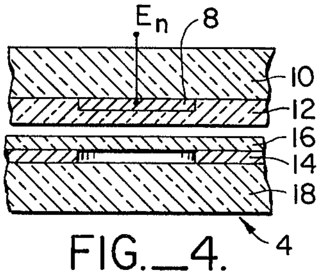
FIG.__4.
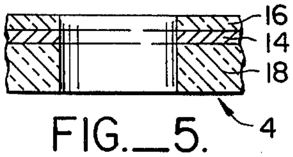
FIG.__5.
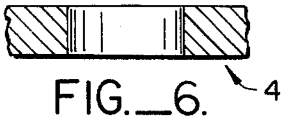
FIG.__6.
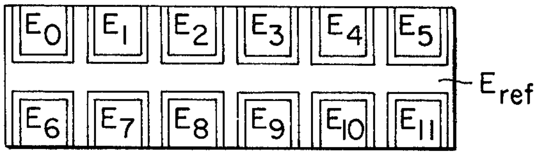
FIG.__7.

ULTRASONIC AND CAPACITIVE ELECTRONIC KEY SYSTEMS

This is a division of application Ser. No. 947,596, filed Oct. 2, 1978.

BACKGROUND OF THE INVENTION

This invention relates generally to keying systems and, more particularly, to keys for use with capacitive and ultrasonic keys and key sensors and to such keys and key sensors in combination with electronic circuitry for controlling locking mechanisms.

Keying systems for electrically controlling locking mechanisms have been known for decades. An example of an early such system is U.S. Pat. No. 2,008,150, issued July 16, 1935 to A. S. Nelson in which a light source is interrupted by movable elements to control the source's light rays received at a light sensor which in turn controls a bolt. The Nelson patent references patents on electromagnetically operated locks as early as 1876.

More modern electrical lock keying systems are disclosed in the following U.S. Pat. Nos.: 2,692,495, Verdan, Oct. 26, 1954; 3,231,693, McLaughlin, Jan. 25, 1966; 3,660,831, Nicola et al., May 2, 1972; 3,705,277, Sedley, Dec. 5, 1972; All of the above U.S. patents are incorporated herewith by reference. In the Verdan, McLaughlin and Sedley patents, respectively, counter keys, set cards and program cards are housed in the locking mechanism and correspondence with a "key" is required to unlock the mechanism. Various means are disclosed or suggested to encode the "keys" and corresponding "counter keys" in the lock housings including magnetic, mechanical, electrical, electro-mechanical, electro-optic, pneumatic and hydraulic type devices. Nicola et al describes a system having an electronic logic circuit to sense electrical contacts established by a key. Hall effect sensors are also known in the prior art.

One disadvantage of key/counter-key systems is the requirement for individually inserting and replacing the counter keys at each lock in order to change the lock coding. Also, the various prior art sensing arrangements all suffer from one or more disadvantages such as susceptibility to key or sensor wear by way of the wearing of moving parts or the degradation of contacts between the key and sensor, key complexity and expense, sensor complexity and expense and susceptibility to dirt.

SUMMARY OF THE INVENTION

In order to overcome these and other disadvantages of the prior art and to provide an improved keying system for use in controlling locking mechanisms, the present invention provides for a system in which the key and sensor are both simple and inexpensive and in which there are no moving parts or contacts to degrade or wear out. Programmable logic circuits operate in connection with the sensing function to provide for ease of changing the key code and for remote control of the coding, if desired, as for example, in a hotel room keying system.

More particularly, two preferred embodiments of keys and key sensors, respectively, are provided: in one, the key encoding is capacitively sensed; in the other, the key encoding is ultrasonically sensed. When decoded, the key encodings are digital codes that can be readily handled by solid state logic circuits. The locking mechanism, per se, may take any number of forms that are controllable by an electric signal and form no part of the invention.

These and other advantages and details of the invention will be further appreciated as the following detailed description is read in connection with the drawings.

BRIEF DESCRIPTION OF THE DRAWINGS

FIG. 1 is a schematic view of a capacitive sensor array.

FIG. 2 is a schematic view of a key for use with the capacitive sensor.

FIG. 3 is a cut away sectional view through an array such as in FIG. 1 in juxtaposition with a key such as in FIG. 2 in the vicinity of a nonapertured location.

FIG. 4 is a view similar to FIG. 3, but in the vicinity of an apertured position in the key.

FIG. 5 is a cut away sectional view through a portion of a key.

FIG. 6 is a similar view of a modified key structure.

FIG. 7 is a schematic view of a further capacitive sensor array configuration.

DETAILED DESCRIPTION OF THE PREFERRED EMBODIMENTS

Figure 8:
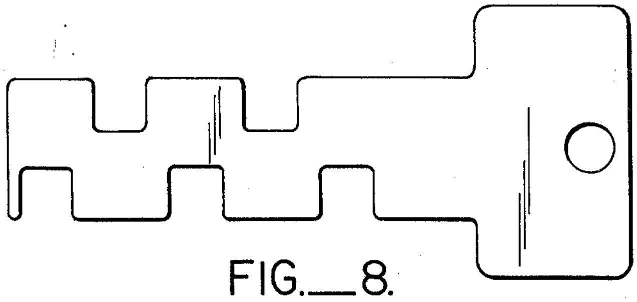
FIG. 8 is a schematic view of a further key configuration for use with a capacitive sensor.

Referring now to the drawings and more particularly to FIGS. 1–8 wherein various aspects of the capacitance sensing embodiment is shown. FIG. 1 shows an exemplary arrangement for a sensor means in the form of an array 2 having 12 electrodes $E_0$–$E_{11}$ for sensing capacitance relative to a reference ground plane electrode $E_{ref}$ at 12 spatial positions. FIG. 2 shows an exemplary key means in the form of a card having an arbitrary coding. The key means coding is achieved by providing a conductive key member 4 with non-conductive areas 6 arranged to be adjacent ones of the electrodes $E_0$–$E_{11}$ of the sensor array when the key means and sensor means are aligned and juxtaposed. The conductive body 4 of the key means capacitively couples to the reference ground plane $E_{ref}$, consequently, the capacitance between any particular electrode $E_0$–$E_{11}$ and $E_{ref}$ is less if a non-conductive area 6 is present at the particular spatial position than if that area is conductive. This effect and further details of the construction of the sensor means and key means are shown in FIGS. 3 and 4.

The conductive electrodes of the sensor array may be conductive films on a substrate, similar to the configuration of printed circuit boards. Also, the key means may also be so configured or can be configured as a homogeneous conductive piece with or without a covering or coverings to obscure the non-conductive areas from visual inspection.

In FIG. 3 the portion of the sensor array 2 in the vicinity of any arbitrary electrode $E_n$ of the group $E_0$–$E_{12}$ is shown relative to the corresponding portion of the juxtaposed key member 4. The sensor array 2 has conductive film 8 on an insulator substrate 10. A protective coating 12 covers the conductive film 8. Coating 12 is preferably opaque to discourage the undesired determination of sensor electrode spatial positions. Coating 12 is non-conductive and preferably inexpensive, adaptable to mass production manufacturing techniques and resistant to wear and vandalism.

Similarly, key member 4 has a conductive film 14 covered by a protective coating 16 on an insulator substrate 18. The two protective coatings 12 and 16 are touching or are separated by a very thin air space 20, as shown.

Conductive films 8 and 14 capacitively couple and the measured capacitance between the reference electrode $E_{ref}$ and any arbitrary electrode $E_n$ will be some one of two values depending on whether the adjacent $E_n$ key location, is conductive (as shown in FIG. 3) or non-conductive. The absolute value of capacitance will depend on the dimensions and spacings of the conductive films.

FIG. 4 shows further portions of sensor array 2 and key member 4, for portions where the corresponding spatial position of the key member is non-conductive. In this case the capacitance measured between $E_n$ and $E_{ref}$ is less than in the FIG. 3 arrangement. Hence, either of two capacitance values will be measured between each electrode $E_n$ and $E_{ref}$, depending on the presence or absence of conductive material in the juxtaposed key member at the particular spatial location.

In order to establish non-conductive regions in the key member configuration of FIGS. 3 and 4, a technique such as laser machining may be used. Alternatively, the non-conductive regions can be established by mechanically drilling or punching apertures such as in FIG. 5. As a further alternative, a homogeneous conductive (metal, for example) key member can be used having apertures mechanically drilled or punched as in FIG. 6.

The configuration of electrodes in the sensor array can take various forms. For example, an array arrangement such as shown in FIG. 7 can be provided for use with a key such as in FIG. 8 that is similar in appearance to a conventional pin and tumbler key.

Figure 9:
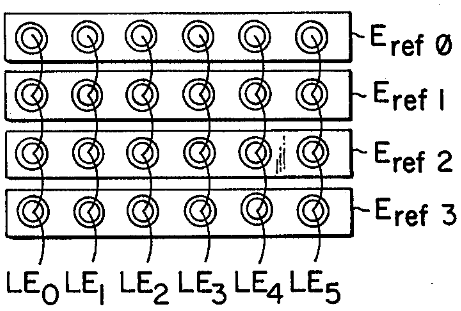
FIG. 9 is a schematic view of yet a further capacitive sensor array.
Figure 10:
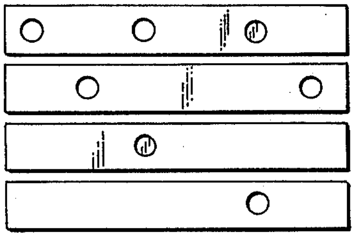
FIG. 10 is a schematic view of yet a further key configuration for use with a capacitive sensor.

A further modification of the sensor array is shown in FIG. 9. A plurality of reference electrodes $E_{ref\phi}$–$E_{ref3}$ are arranged in parallel rows of spaced strips. Each reference electrode has a plurality of individual electrodes such as described in connection with FIGS. 1, 3 and 4. In this arrangement columns of electrodes are electrically connected to provide row leads $LE_\phi$–$LE_5$. The corresponding key shown in FIG. 10, is a plurality of conductive strips held together by a suitable durable non-conductive means, the conductive areas matching the outline of the sensor array reference conductive strips. As described above, non-conductive areas in the key provide the coding. With this configuration the hole/no hole condition is measured under any electrode by choosing the leads corresponding to the row and column intersecting at the electrode.

The FIGS. 9 and 10 configurations are useful where a large number of bits are required for key identification purposes, as for increased security. Also, this configuration reduces the number of leads to the electronic sensing circuit for a particular number of electrodes. The additional bit capacity of this arrangement can be useful for permitting part of the key code to be used for the lock code and part for a key identification to permit a record of entry.

Figure 11:
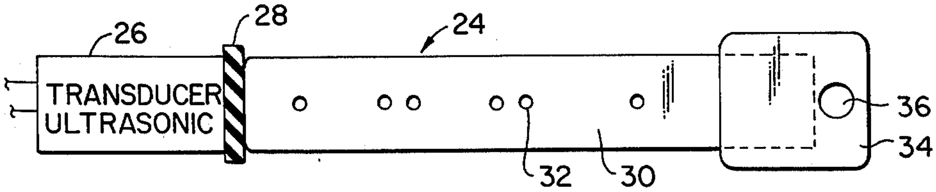
FIG. 11 is a schematic view of an ultrasonic transducer coupled to an encoded key.
Figure 12:
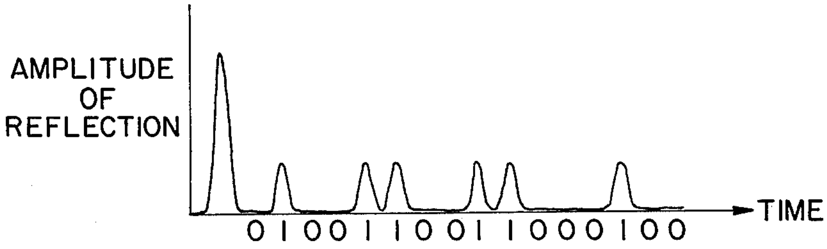
FIG. 12 is a waveform useful in understanding the operation of FIG. 11.
Figure 13:
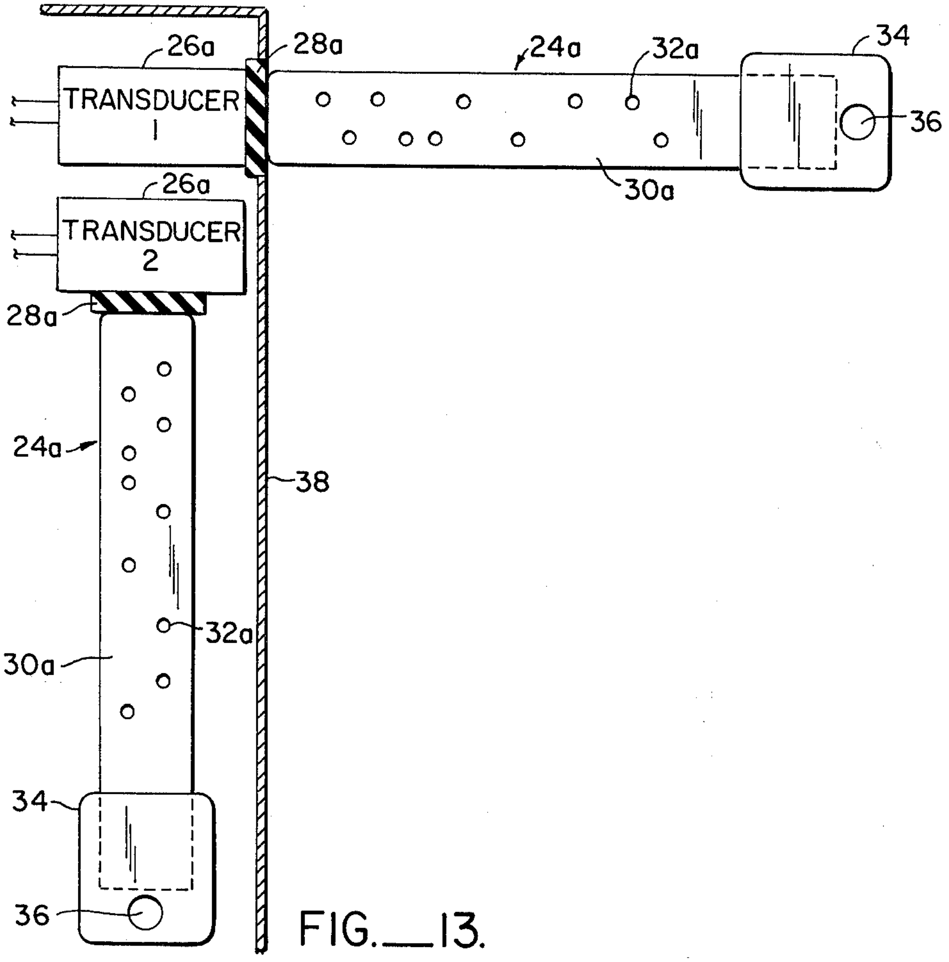
FIG. 13 is a schematic view of a modified ultrasonic transducer key system in which a reference key is employed.

FIGS. 11, 12 and 13 are directed to the ultrasonic key and sensor embodiments of the invention. Referring to FIG. 11, a specially constructed key 24 is shown coupled to an ultrasonic transducer 26 through a suitable mechanical coupling 28 such as a thin layer of loaded silicone rubber. Coupling 28 is selected to provide adequate coupling of ultrasonic energy between the key and transducer. Preferably transducer 26 is a single device which converts electual energy to ultrasonic energy and vice-versa.

Key 24 as shown in its exemplary form includes a strip 30, having a plurality of apertures 32 along its longitudinal axis, and a finger grip 34 formed from two pieces of durable material clamped to the end of strip 30 by a screw 36. The key apertures 32 can be covered by an opaque material so as to hide the key code. In a practical application a suitable guide means is provided to hold key 30 in position against coupling 28 when the device is operated.

Each ultrasonic pulse generated by transducer 26 is coupled to the key 30 and propagates down its length. Reflections of the pulse occur at each impedance discontinuity, i.e.—at the coupling interface, at each hole and at the distal end of the key. An exemplary plot of reflection amplitude (vertical axis) versus time (horizontal axis) is shown in FIG. 12. The farthest impedance discontinuity takes the longest time. After sending a pulse, the transducer receives the reflections and generates electrical pulses corresponding to the ultrasonic pulse reflections. A suitable circuit periodically generates electrical pulses to cause the transducer to generate ultrasonic pulses and receives the electrical pulses from the transducer representative of the ultrasonic pulse reflections. Such circuits are well known in the art of metal flaw detection. The pulse reflections can be correlated with a reference time frame to provide a binary "1" and "0" coding for storage or for matching with a lock code to operate a lock. The generator circuit can be set to generate pulses continually every ½ to 1 seconds, for example.

In order to provide a clear binary code, the key described in connection with FIGS. 11 and 12 preferably has an impedance pattern characterized by a series of apertures only along a single straight line through the length of the key. If a more complex coding is required, then a comparison of the reflected signal against a stored waveform may be required. One such arrangement is shown in FIG. 13 where a key 24*a* has a plurality of randomly arranged apertures 32*a* along the strip 30*a*. The remaining key structure can be the same as the embodiment of FIG. 11. A housing 38 encloses the coupling 28*a* and transducer 26*a* along with a second key, transducer and coupling used as a reference. Circuitry not shown transmits simultaneously a pulse to each transducer and receives and compares the two reflected signal waveforms. If the two keys are identically coded a verification signal can be generated or if they are different another type of signal can be generated.

In connection with either key/key sensor embodiment, capacitive or ultrasonic, a lock opening algorithm can be optionally employed in order to make each unit virtually "pick-proof". If an incorrect code is sensed a first lock out time must elapse before a second try is accepted by the sensing circuitry. With each incorrect try, the lock out time doubles up to some upper limit. For example, assume an initial lock out time of ¼ second; after 10 errors the lock out time is then 256 seconds (assume this is the upper limit). Thus in order to try all combinations of a 12 bit code, 12.1 days is required. Thus the system is resistant to trial and error variations of the key coding.

Figure 14:
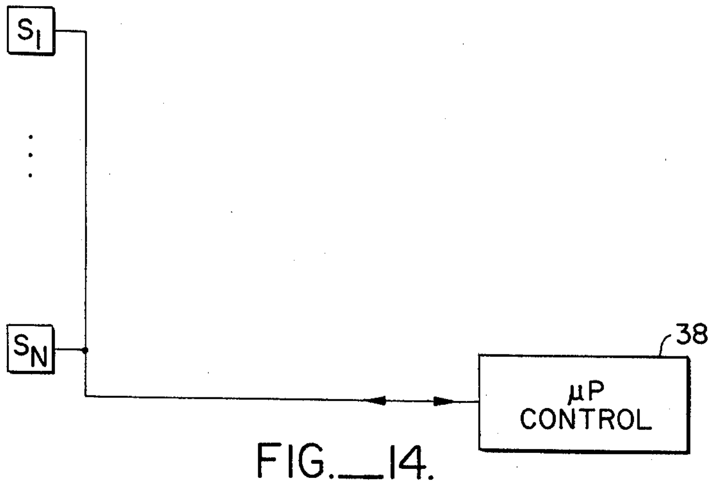
FIG. 14 is a block diagram showing the remote control of a plurality of electronic key systems.

Both the capacitive and ultrasonic embodiments are also readily usable in remotely programmed lock systems. For example as shown in FIG. 14, a plurality of sensors $S_I$–$S_N$ are electrically connected to a central control 38 such as a general or special purpose microcomputer which can remotely and selectively program the lock codes and/or otherwise monitor the use of each sensor.

The capacitive and ultrasonic embodiments are also easily locally programmed by means that provide digital codes such as switches, jumpers, plugs, pins, read only memories (ROM's) and the like.

I claim:

1. An electronic key system for use with a locking device comprising key means having a preselected pattern of impedance to an ultrasonic pulse propagated therethrough for reflecting an applied ultrasonic pulse in a preselected pattern, means for generating and sensing ultrasonic pulses, and means for coupling said generating and sensing means to said key means when said key means is located in juxtaposition to said coupling means.

2. The combination of claim 1 wherein said key means comprises a member having discontinuities establishing said preselected impedance pattern.

3. The combination of claim 2 wherein said discontinuities are apertures.

4. The combination of claim 3 further comprising a covering for said member to cover said apertures against visual inspection.

5. The combination of claim 1 further comprising adjustable means connected to said sensing means for setting a selected lock code.

6. A remotely controlled electronic key system for use with a plurality of locking devices comprising a plurality of electronic key systems, each comprising key means having a preselected pattern of impedance to an ultrasonic pulse propagated therethrough for reflecting an applied ultrasonic pulse in a preselected pattern, means for generating and sensing ultrasonic pulses, means for coupling said generating and sensing means to said key means when said key means is located in juxtaposition to said coupling means, means connected to said sensing means to generate a signal when the lock code of the sensing means matches the lock code of the key means, and central control means electrically connected to each of said plurality of electronic key systems for controlling the lock code of each of said sensing means.

* * * * *